May 24, 1966  J. A. SAMWEL  3,253,266
CALCULATING MACHINE
Filed March 16, 1962  4 Sheets-Sheet 2

FIG_3

United States Patent Office 3,253,266
Patented May 24, 1966

3,253,266
CALCULATING MACHINE
Jan A. Samwel, Nijmegen, Netherlands, assignor, by mesne assignments, to Friden, Inc., San Leandro, Calif., a corporation of Delaware
Filed Mar. 16, 1962, Ser. No. 180,091
Claims priority, application Netherlands, Mar. 28, 1961, 262,911
13 Claims. (Cl. 340—172.5)

With relatively small computers such as are used with invoicing machines, bookkeeping machines and the like, it is generally desired that the program to be executed by the computer can be set during the progress of the process by operations carried out outside the computer.

With the known computers of said type, the flexibility thereof is limited. By using a patch panel upon which a certain program can be set, a certain flexibility can be obtained by changing its wiring pattern. Also the instructions which the machine requires can be introduced into the machine by making use of a movable program tape.

Moreover said known systems show the drawback that relatively much time is consumed to effect the program changes.

The object of the invention is to provide a device wherein it is possible to selectively arrange a relatively large number of subprograms each consisting of a relatively small number of instructions. Owing to this a large number of different main programs can be composed. In different terms, the object of the invention is to provide a machine having a large flexibility. Another object of the invention is to permit program changes to be carried out with high speed and with a construction which is as simple as possible.

To this end the device, according to the invention, is characterized by a two-dimensional switching matrix, the crosspoints of which correspond with the instructions to be carried out by the computer, while a plurality of program wires extending in the one coordinate direction of the matrix are connected to a selecting apparatus for seizing a selective one of said wires, while a plurality of indicating wires extending in the other coordinate direction are connected to the outputs of a stepping switch having a fixed starting position, which stepping switch is advanced one step under control of the computer if the instruction corresponding with the cross-point, as indicated by the selecting apparatus and said stepping switch, is carried out, while said stepping switch is reset to the starting position when a predetermined number of steps has been carried out.

Further, a programming device to be used with computers having an internal memory is, according to the invention, characterized by a three-dimensional switching matrix known per se which is built up of memory elements arranged in X-, Y- and Z-planes, while by each of the series of memory elements arranged side-by-side in the Z-direction a word line is formed, and the information for an instruction to be carried out by the computer is contained in such a word line, while the wires for selecting a Y-plane are connected to a selecting apparatus for selectively energizing said wires, while the wires for selecting an X-plane are connected to the outputs of a stepping switch having a fixed starting position, said stepping switch is advanced one step under control of the computer if the instruction corresponding with the word line indicated by the selecting apparatus and the stepping switch is carried out, while said stepping switch is returned into the starting position each time that said selecting apparatus is set at another wire.

In another embodiment of the programming device, according to the invention, said selecting apparatus is coupled to said stepping switch in such a manner that each time the selecting apparatus is set at another program wire, the stepping switch is returned to its starting position.

More particularly a programming device to be used with computers having an external programming is, according to the invention, realized in such a manner that each one of said indicating wires is connected through a gate comprising a diode and a resistor series connected therewith to each one of said program wires, while between each one of the junction points formed by such a diode and associated resistor and one or more hubs of a patch panel, a releasable electric connection is provided, wherein one or more diodes are included.

In yet another embodiment of the device according to the invention said stepping switch is an electronic counter, comprising a plurality of counting stages, said plurality being determined by the maximum number of instructions which is to be expected in a subprogram.

The invention will be further described with reference to the drawings wherein some embodiments are shown.

Figure 1:
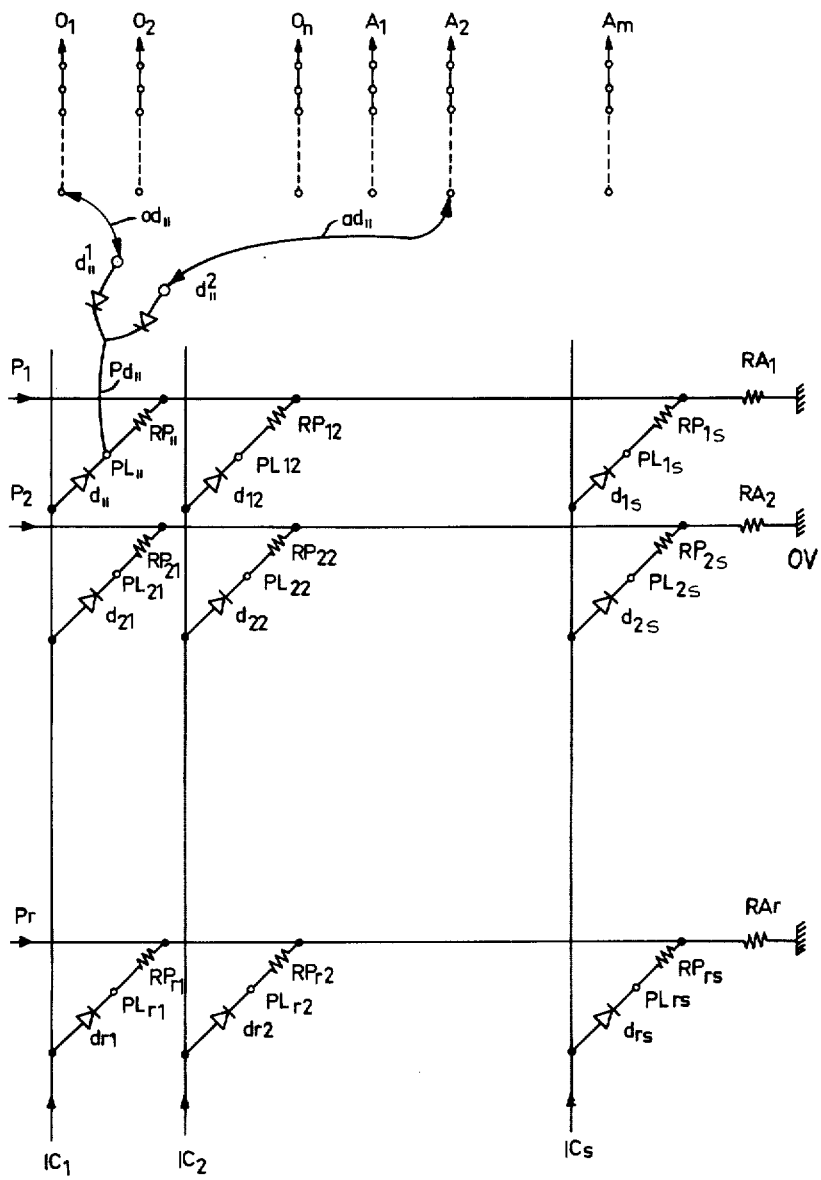
FIG. 1 is a diagram of a programming device according to the present invention to be used with a computer having an external program.

The programming device shown in FIG. 1 comprises a two-dimensional switching matrix with horizontal lines $P_1, P_2$ * * * $P_r$, the so-called "program lines," and vertical lines $IC_1, IC_2$ * * * $IC_s$, the so-called "instruction-indicating lines." The one ends of the program lines are connected to "ground" (0 v.) through resistors $RA_1$, $RA_2$ * * * $RA_r$, while the other ends are connected to a selecting apparatus, or program switch 20 (FIG. 3), for selectively connecting said program lines one at a time to six-volts negative relative to "ground" under control of an operation carried out outside the computer. Said operation can be performed by operating a key or switch 21, which operation can take place either manually or by means of a mechanically moved member which is coupled to the input device.

Each one of said program lines $P_1, P_2$, etc. (FIG. 1), represents a certain subprogram or, in other terms, a program which forms a part of the main program to be carried out. Said subprograms are prestored in a patch panel 22 associated with a computer 23 (FIG. 3) and wherein a plurality of hubs are provided. The two groups of hubs $O_1, O_2$ * * * $O_n$ and $A_1, A_2$ * * * $A_m$ (FIG. 1), respectively, represent the operations which can be carried out by the computer, and the address positions included in said computer. By means of patch cords, such as $od_{11}$, $ad_{11}$, the instructions for a certain subprogram is prestored in the patch panel for each program line $P_1, P_2$, etc. Each one of said program lines $P_1$, etc., is connected through resistors, such as $RP_{11}$, $RP_{12}$ * * * $RP_{rs}$, through so-called "instruction lines" of which only one is shown in FIG. 1, viz., the instruction line $Pd_{11}$, through diodes, such as $d_{11}^1$ and $d_{11}^2$ to the hubs. If, for instance, the cord $od_{11}$ is inserted in the hub $O_1$ and the cord $ad_{11}$ into the hub $A_2$, as shown in FIG. 1, the first program element of the subprogram associated with the line $P_1$ consists in the instruction "carry out the operation $O_1$ on the contents of address $A_2$." For each instruction, and also for each address, the patch panel is provided with a plurality of multiple connected hubs, which arrangement is indicated in FIG. 1, by the vertical connecting lines between said hubs, as, for example, the several hubs indicated as $O_1$. The instruction-indicating lines $IC_1$, $IC_2$ * * * $IC_s$ are connected to the outputs of a stepping switch or instruction counter 24 (FIG. 3) having a fixed starting position. Each one of said lines $IC_2$, etc., is connected to each one of said program lines through a diode, such as $d_{11}$, $d_{12}$ * * * $d_{rs}$ (FIG. 1) and a series-connected resistor, such as $RP_{11}$, $RP_{12}$ * * * $RP_{rs}$. The diode and resistor at each crosspoint of the matrix constitute an AND-gate. By means of said stepping switch 24, said instruction-indicating lines are successively connected to a voltage of −6 v. If, for example, as already mentioned above, the program line $P_1$ is connected to −6 v. and the indicating line $IC_1$ is connected to −6 v. by the stepping switch, then the instruction line $Pd_{11}$ associated with the crossing point of the program line $P_1$ and the indicating line $IC_1$, is energized at −6 v., so that the instruction inserted into the patch panel in the present example $O_1$, $A_2$ will be performed by the computer. After said instruction has been performed by the computer 23 (FIG. 3), an "INSTRUCTION COMPLETE" signal is supplied to the stepping switch along a control line 26 (FIG. 3) by means of which it is advanced one step. In different terms, the indicating line $IC_1$ (FIG. 1) is switched to the inoperative condition of zero volts (0 v.), and the indicating line $IC_2$ is switched from the inoperative condition to the operative condition of −6 v. This means that the instruction associated with the crossing point of the program line $P_1$ and the indicating line $IC_2$ is carried out by the computer 23, whereupon the stepping switch 24 is again advanced one step.

In this manner the instructions associated with the program line $P_1$ are automatically carried out. It will be clear that during the execution of said subprogram the related program line must be maintained in its operative condition. In different terms, said line must remain connected to −6 v. Further, it results from the circuit of FIG. 1 that only the point $PL_{11}$ is indicated when both the program line $P_1$ and the indicating line $IC_1$ are connected to −6 v. In this case the associated hubs $O_1$, $A_2$ receive current through the associated diodes $d_{11}{}^1$, $d_{11}{}^2$ because diode $d_{11}$ is conductive. All the other points $PL_{12}$ * * * $PL_{rs}$ have a potential of 0 v., because the diodes $d_{12}$ * * * $d_{1s}$ of the unenergized vertical lines $IC_2$, etc., are non-conductive. In a similar manner it will be clear that for instance a point, such as $PL_{22}$, associated with the crosspoint of the program line $P_2$ which, for instance, is not energized and the indicating line $IC_1$ which is energized, has a voltage of 0 v.

Figure 3:
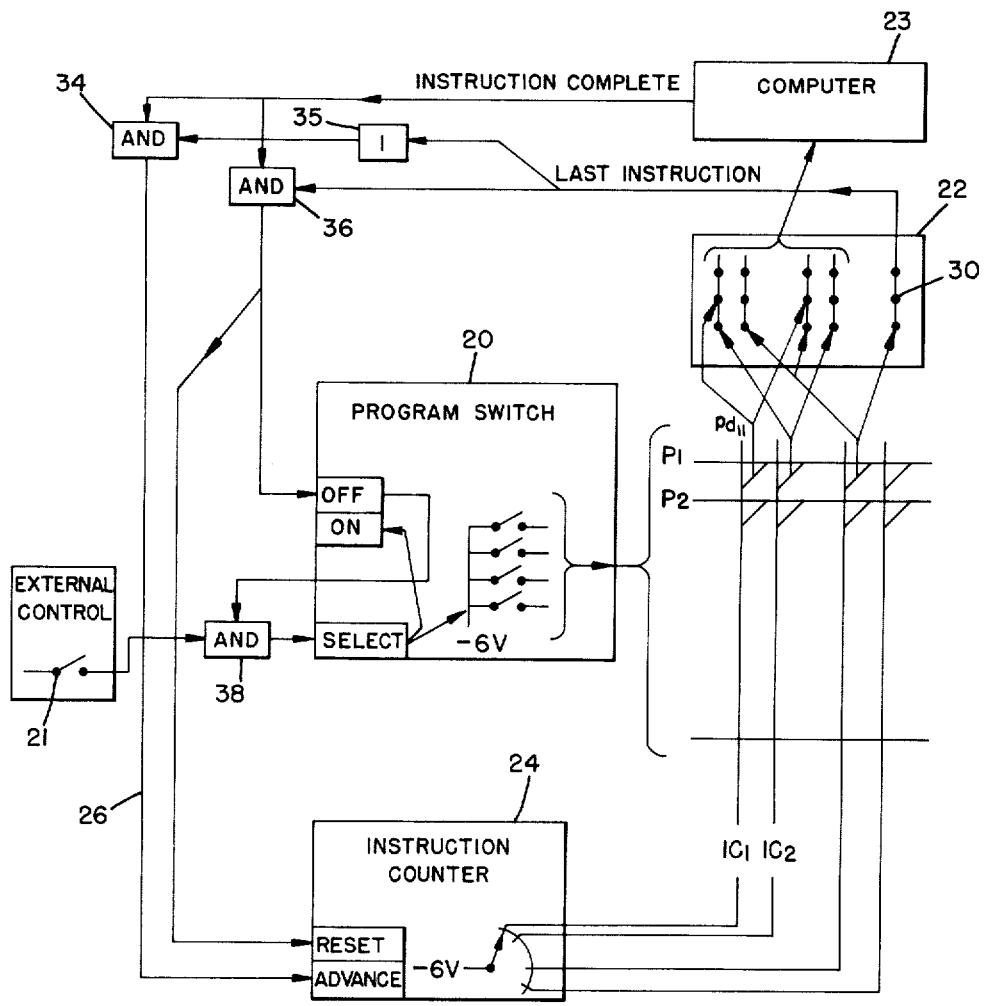
FIG. 3 is a schematic diagram of a computing system including the program device of FIG. 1; and, FIG. 4 is a schematic diagram of another computing system including the program device of FIG. 1.

In the operation of the system of FIG. 3, the step switch 24 initially will be at its starting position in which it will energize the instruction-indicating line $IC_1$. Operation is initiated by the operation of the switch 21 in the external control which transmits a signal through an AND-gate 38 for selecting a particular one of the program lines $P_1$, etc. This action also energizes the program switch 20 which, in turn, disables gate 38. With the first instruction-indicating line $IC_1$ energized and one of the program lines energized, the first instruction of that subprogram, as set up on the wiring of the patch panel 22, is transmitted to the computer 23 which immediately begins operating in accordance with that instruction. Upon the completion of that instruction, an "INSTRUCTION COMPLETE" signal is transmitted through an AND-gate 34 to the step switch 24 for advancing it one step. This action energizes the second instruction line $IC_2$ for transmitting the next instruction to the computer 23 which, upon completing the instruction, transmits a signal to the step switch 24 for advancing it again.

Each subprogram may consist of any number of instructions up to the number of the instruction-indicating lines $IC_1$, etc. Assume that the subprogram being performed is $P_2$ and that this subprogram has five instructions. The output point $PL_{25}$ of the crossing between the lines $P_2$ and $IC_5$, in addition to being connected to one of the instruction hubs $O_1$, etc., and to one of the address hubs $A_1$, etc., will have a third connection to a "LAST INSTRUCTION" hub 30. Consequently, at the time the step switch 24 is advanced to the fifth position in this program $P_2$, an enabling signal is transmitted from hub 30 to an AND-gate 36. This same signal passes through an inverter 35 for disabling the AND-gate 34. The "INSTRUCTION COMPLETE" signal will then be blocked at gate 34 to prevent the advance of the step switch 24, and instead will be passed through gate 36 for resetting the step switch. The output of AND-gate 36 constitutes a "PROGRAM COMPLETE" signal which is transmitted also to the program switch 20 for turning it "OFF," leaving all program lines $P_1$, $P_2$, etc., de-energized, that is, at 0 v. In its "OFF" condition, the program switch 20 enables the AND-gate 38 through which the next selection and start signal from the external control can pass.

Owing to the fact that by means of the selecting apparatus 20 (FIG. 3) the sequence in which the program lines $P_1$, etc., are energized, can be selectively determined, a total of $r!$ ($r$ factorial) different main programs can be composed if the number of program lines amounts to $r$, that is, if there is a plurality of $r$ subprograms. It will be clear that the number of outputs of the stepping switch 24 must be equal to the number of instructions which, at the utmost, can occur in a subprogram.

Figure 4:
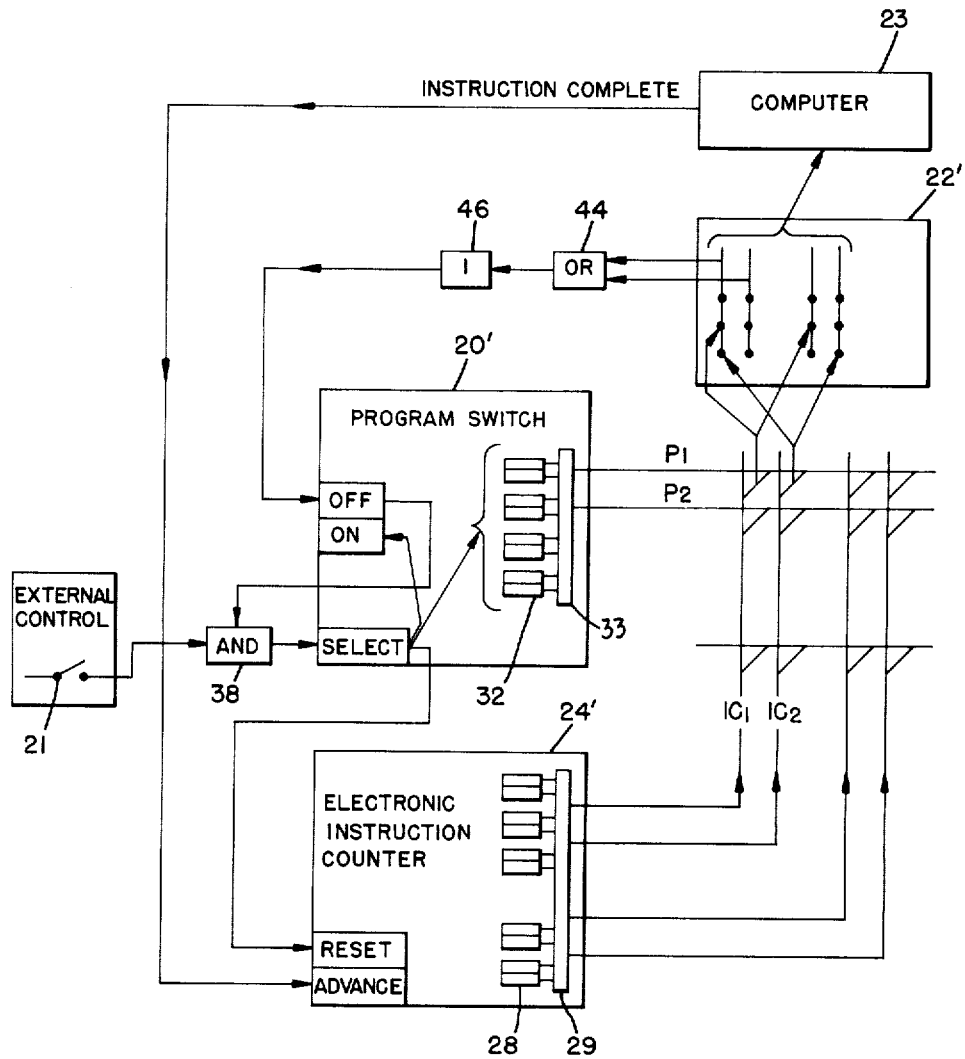

In the system of FIG. 4, an electronic instruction counter 24' comprises a plurality of bistable devices 28 and a decoding device 29 for energizing the lines $IC_1$, $IC_2$, etc., in turn. It may be advanced any number of counting steps up to the capacity of the machine, and then may be reset to the starting condition. A program switch 20' includes electronic bistable devices 32 and a decoding device 33 for energizing the lines $P_1$, $P_2$, etc., in any selected order.

This system of FIG. 4 includes the same matrix, including the program lines $P_1$, $P_2$, etc., and the instruction-indicating lines $IC_1$, $IC_2$, etc., as in the system of FIG. 3, a similar patch panel 22', and the same computer 23. Patch panel 22' has no "LAST INSTRUCTION" hubs 30. Instead, the output from all of the instruction hubs $O_1$, $O_2$, etc., are fed into an OR-gate 44, and the output of this gate is inverted at 46 for supplying a "subprogram complete" signal to the "OFF" control of the program switch 20'.

Operation of the system of FIG. 4 is initiated by a signal from switch 21 of the external control, which signal passes through an AND-gate 38 for causing the selection of one of the lines $P_1$, $P_2$, etc. This action turns the program switch 20' on and also transmits a reset signal to the instruction counter 24'. Thus one of the program lines $P_1$, etc., and the first instruction-indicating line $IC_1$, are energized for transmitting a signal through patch panel 22' to the computer 23. Upon the completion of the instruction by the computer, an "INSTRUCTION COMPLETE" signal from computer 23 is transmitted to the counter 24' for advancing it for energizing the next instruction line $IC_2$ for thereby transmitting the next instruction to the computer 23. As long as a signal is thus supplied to any one of the instruction hubs $O_1$, etc., of the patch panel 22', a signal (−6 v.) is supplied to the OR-gate 44, which signal is inverted at 46 for causing an output of 0 v. After the completion of the last instruction, the automatic advance of the instruction counter 24' to the next instruction line, which will have no connection to the patchboard, fails to supply a signal to the OR-gate 44, the output of which will then be 0 v. for causing an output of −6 v. from the inverter 46. This signal is transmitted to the "OFF" control of the program switch 20' for turning it off. This action leaves the counter 24' energizing one of the instruction-indicating lines $IC_1$, etc., but with all of the program lines $P_1$, etc., de-energized. This condition does not supply any signal to the patchboard 22' nor any instruction to the computer 23. With the program switch 20' in its "OFF" condition, a signal is supplied to AND-gate 38 for permitting the passage of the next signal from the external control to the program switch 20' for initiating another subprogram. Such a signal selects the particular one of the lines $P_1$, $P_2$, etc., for the next subprogram, turns on the switch 20' and supplies the reset signal to the instruction counter 24'.

Figure 2:
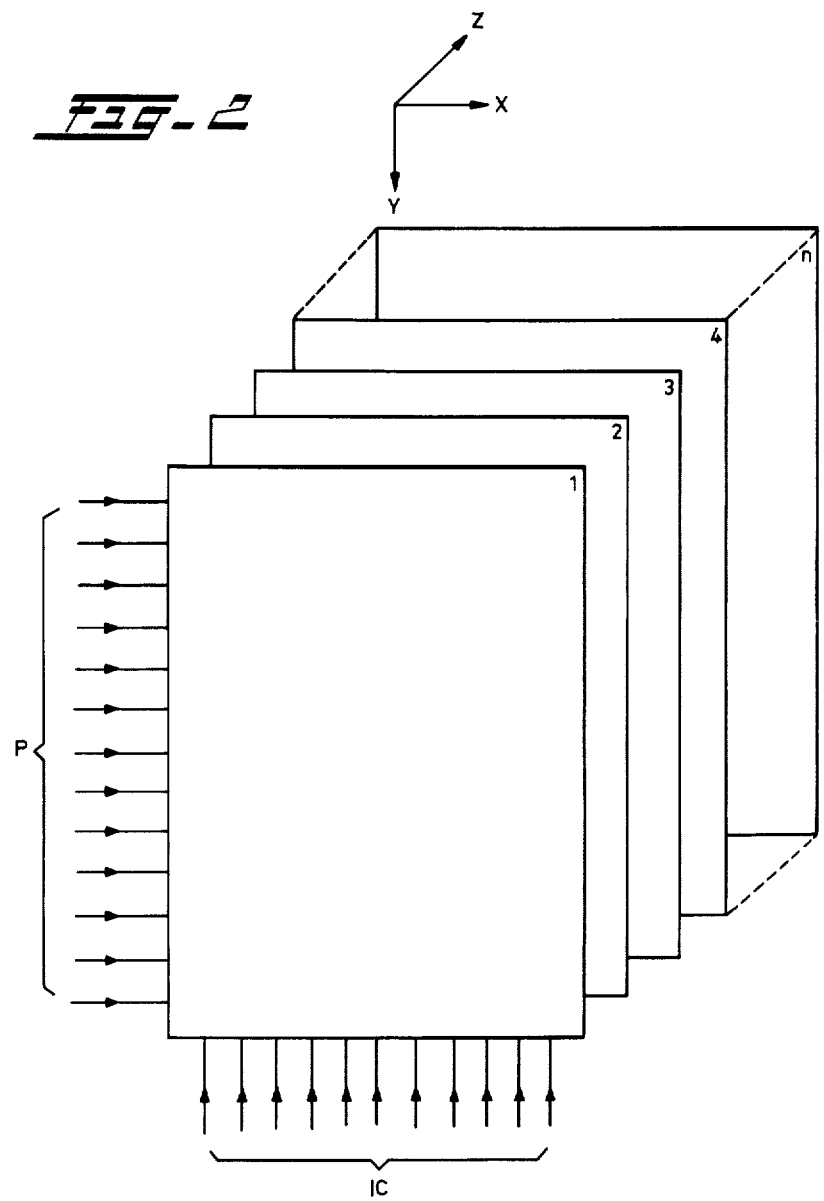
FIG. 2 represents schematically in what manner the principle of the construction according to FIG. 1 can be used with a computer having a stored program.

FIG. 2 shows schematically in what manner the principle of the device according to FIG. 1 can be applied to a machine having a stored program. There the internal memory of the machine comprises a three-dimensional matrix, such as is known per se for instance from the published Dutch patent application 189,346 and the book "Logical Design of Digital Computers," Wiley, 1958, chapter 7, pages 197, 198 by Montgomery Phister, Jr. Such a matrix comprises magnetic memory elements arranged in X-, Y-, and Z-planes whereby a word composed of a plurality of binary data which, for instance, comprises an instruction can be written in, and read out of, a series of memory elements arranged side-by-side in the Z-direction, each of which series forms a word line. The selecting apparatus mentioned above, as well as the stepping switch, can then be used to select a Y-plane through the program lines P, and an X-plane through the instruction-indicating lines IC. There are as many planes 1, 2 * * * * $n$ as there are bits in a word. Said words are read out in parallel form or stored in a buffer memory, whereupon the information thus stored can be transmitted to the machine.

I claim:

1. In combination with a computer having a plurality of instuction-activating inputs, a programming device comprising:
    (1) a switching matrix having a plurality of instruction-indicating lines and a plurality of program lines,
    (2) a plurality of AND-gate circuits each having
        (a) an input connection to one of said program lines,
        (b) an input connection to one of said instruction-indicating lines, and
        (c) an output to an instruction activating line of said computer,
    (3) an instruction counter for energizing said instruction-indicating lines one at a time in predetermined counting sequence,
    (4) a program switch for selectively energizing said program lines, one at a time, and
    (5) means controlled by said computer for advancing said instruction counter through each counting step thereof in response to a signal on a said instruction-activating line.

2. The combination of claim 1 wherein there is included, means for resetting said counter from any counting position to starting position.

3. The combination of claim 2 wherein said instruction counter is operable to return to starting condition under direct control of the output from said swiching matrix.

4. The combination of claim 1 wherein said program switch is turned off for leaving all said program lines deenergized in response to the condition of an output from said switching matrix.

5. The combination of claim 1 wherein said program switch is turned off for leaving all said program lines de-energized in response to a predetermined output signal from said switching matrix.

6. The combination of claim 1 wherein said program switch is turned off for leaving all said program lines de-energized in response to the absence of any instruction signal from said switching matrix to said computer.

7. The combination of claim 1 wherein said instruction counter is operable to return to its starting position simultaneously with an operation of said selection switch that energizes a program line.

8. The combination of claim 1 wherein said instruction counter is operable to return to its starting position simultaneously with an operation of said selection switch that de-energizes a program line.

9. In combination with a computer having a plurality of instruction-activating inputs and having means for delivering an instruction-completed signal, a programming device comprising:
    (1) selecting apparatus operable for selectively providing a plurality of program-selecting signals,
    (2) a stepping switch operable through a counting sequence from a fixed starting position for providing counting signals,
    (3) a two-dimensional switching matrix, the crosspoints of which correspond with the instructions to be carried out by the computer, said matrix including
        (a) a plurality of program wires extending in one coordinate direction of the matrix connected to said selecting apparatus for receiving said program-indicating signals therefrom,
        (b) a plurality of indicating wires extending in the other coordinate direction connected to the step-outputs of said stepping switch for receiving said counting signals therefrom,
        (c) means for generating instruction-activating signals at each said cross-point in response to said signals on said wires thereat,
    (4) output connections for transmitting said instruction-activating signals from said cross-points to said computer,
    (5) means operable for advancing said stepping switch through a counting step in response to each said instruction-completed signal from said computer, whereby said matrix is operable to transmit to said computer a new instruction-activating signal in response to each such signal from said computer, and
    (6) means for resetting said stepping switch to said fixed starting position when a predetermined number of steps has been carried out.

10. In combination with a computer having a plurality of instruction-activating inputs and having means for delivering an instruction-completed signal, a programming device comprising:
    (1) selecting apparatus operable for selectively providing a plurality of program-selecting signals,
    (2) a stepping switch operable through a counting sequence from a fixed starting position for providing counting signals,
    (3) a two-dimensional switching matrix, the crosspoints of which correspond with the instructions to be carried out by the computer, said matrix including
        (a) a plurality of program wires extending in one coordinate direction of the matrix connected to said selecting apparatus for receiving said program-indicating signals therefrom,
        (b) a plurality of indicating wires extending in the other coordinate direction connected to the step-outputs of said stepping switch for receiving said counting signals therefrom,
        (c) means for generating instruction-activating signals at each said cross-point in response to said signals on said wires thereat,
    (4) output connections for transmitting said instruction-activating signals from said cross-points to said computer,
    (5) means operable for advancing said stepping switch through a counting step in response to each said instruction-completed signal from said computer, whereby said matrix is operable to transmit to said computer a new instruction-activating signal in response to each such signal from said computer, and
    (6) means for resetting said stepping switch to said fixed starting position each time that said selecting apparatus is operated to deliver a different program-selecting signal.

11. The programming device of claim 10 wherein there is included a separate such output connection for transmitting instruction-activating signals as aforesaid from each of a plurality of said cross-points along each of certain of said program wires and along each of certain of said indicating wires.

12. A device acording to claim 10 characterized in that each one of said indicating wires is connected through a diode and a resistor series connected therewith to each one of said program wires, while between each one of the junction points formed by such a diode and associated resistor and one or more hubs of a patch panel, a releasable electric connection is provided, wherein one or more diodes are included.

13. A device according to claim 10 characterized in that said stepping switch is an electronic counter, comprising a plurality of counting stages said plurality being determined by the maximum of instructions which is to be expected in a subprogram.

References Cited by the Examiner
UNITED STATES PATENTS

| | | | |
|---|---|---|---|
| 3,033,447 | 5/1962 | Buegler et al. | 340—172.5 |
| 3,039,690 | 6/1962 | Yandell | 235—157 |
| 3,048,332 | 8/1962 | Brooks | 340—172.5 |
| 3,069,658 | 12/1962 | Kramskoy | 340—172.5 |

ROBERT C. BAILEY, *Primary Examiner.*